US008898351B2

(12) United States Patent
Povaliaev et al.

(10) Patent No.: US 8,898,351 B2
(45) Date of Patent: Nov. 25, 2014

(54) DYNAMIC COMPRESSION OF AN I/O DATA BLOCK

(75) Inventors: Aleksander Gennadevich Povaliaev, Saint-Petersburg (RU); Helen S. Raizen, Jamaica Plain, MA (US)

(73) Assignee: EMC Corporation, Hopkinton, MA (US)

( * ) Notice: Subject to any disclaimer, the term of this patent is extended or adjusted under 35 U.S.C. 154(b) by 309 days.

(21) Appl. No.: 13/249,506

(22) Filed: Sep. 30, 2011

(65) Prior Publication Data
US 2012/0173778 A1 Jul. 5, 2012

Related U.S. Application Data

(63) Continuation-in-part of application No. 12/981,978, filed on Dec. 30, 2010, now Pat. No. 8,452,900.

(51) Int. Cl.
*G06F 3/00* (2006.01)
*G06F 3/06* (2006.01)

(52) U.S. Cl.
CPC ............ *G06F 3/0659* (2013.01); *G06F 3/0608* (2013.01); *G06F 3/0613* (2013.01); *G06F 3/064* (2013.01); *G06F 3/067* (2013.01)
USPC .......................................................... 710/39

(58) Field of Classification Search
CPC ..... G06F 3/0659; G06F 3/0613; G06F 3/064; G06F 3/067; G06F 3/0608
USPC .......................................................... 710/39
See application file for complete search history.

(56) References Cited

U.S. PATENT DOCUMENTS

| 6,877,045 | B2 * | 4/2005 | Goode et al. ....................... 710/6 |
| 7,071,999 | B2 * | 7/2006 | Lee ................................. 348/714 |
| 7,529,867 | B2 * | 5/2009 | McCrory et al. ................. 710/52 |
| 7,613,380 | B2 * | 11/2009 | Yanagita ........................ 386/326 |
| 7,702,857 | B2 * | 4/2010 | Gill et al. ...................... 711/137 |
| 7,719,443 | B1 * | 5/2010 | Natanzon ......................... 341/51 |
| 7,774,565 | B2 * | 8/2010 | Lewin et al. ................... 711/162 |
| 2003/0140183 | A1 * | 7/2003 | Goode et al. ....................... 710/6 |
| 2003/0212694 | A1 * | 11/2003 | Potapov et al. ............... 707/100 |
| 2004/0054858 | A1 | 3/2004 | Chandrasekaran et al. |

(Continued)

OTHER PUBLICATIONS

"Oracle Advanced Compression", An Oracle White Paper, Apr. 2008.*

(Continued)

*Primary Examiner* — Henry Tsai
*Assistant Examiner* — Jing-Yih Shyu
(74) *Attorney, Agent, or Firm* — Daly, Crowley, Mofford & Durkee, LLP

(57) ABSTRACT

In one aspect, a method of compressing data includes splitting an I/O into smaller I/Os based on an I/O throughput. The size of the smaller I/Os are equal or less than a set block size. The method also includes asynchronously compressing the smaller I/Os. In another aspect, an article includes a non-transitory machine-readable medium that stores executable instructions. The instructions cause a machine to split an I/O into smaller I/Os based on an I/O throughput and asynchronously compress the smaller I/Os. The size of the smaller I/Os being equal or less than a set block size. In a further aspect, a system includes circuitry configured to split an I/O into smaller I/Os based on an I/O throughput and asynchronously compress the smaller I/Os. The size of the smaller I/Os being equal or less than a set block size.

20 Claims, 15 Drawing Sheets

(56) References Cited

U.S. PATENT DOCUMENTS

| | | | |
|---|---|---|---|
| 2004/0247192 A1* | 12/2004 | Kajiki et al. | 382/239 |
| 2004/0255048 A1 | 12/2004 | Lev Ran et al. | |
| 2005/0268068 A1* | 12/2005 | Ignatius et al. | 711/202 |
| 2006/0179173 A1* | 8/2006 | Bockhaus | 710/22 |
| 2006/0212672 A1* | 9/2006 | Chandrasekaran et al. | 711/171 |
| 2008/0104591 A1* | 5/2008 | McCrory et al. | 718/1 |
| 2008/0294863 A1* | 11/2008 | Faerber et al. | 711/170 |
| 2009/0119304 A1* | 5/2009 | Preslan et al. | 707/10 |
| 2010/0070656 A1* | 3/2010 | Snell et al. | 710/5 |
| 2010/0281004 A1* | 11/2010 | Kapoor et al. | 707/693 |
| 2011/0134999 A1* | 6/2011 | Han et al. | 375/240.12 |

OTHER PUBLICATIONS

The HDF Group (THG) HDF5 User's Guide, Release 1.6.6, Aug. 2007, pp. 1-240.

PCT/RU2010/000815 International Search Report dated Jul. 17, 2012, pp. 1-6.
PCT/RU2010/000815 Written Opinion of the International Searching Authority dated Jul. 10, 2012, pp. 1-3.
PCT/RU2010/000815 Notification Concerning Availability of the Publication of the International Application dated Aug. 30, 2012, 1 page.
Office Action dated Dec. 22, 2011 for U.S. Appl. No. 12/981,978, filed Dec. 30, 2010, 21 pages.
Response to Office Action dated Dec. 22, 2011, filed Mar. 22, 2012 for U.S. Appl. No. 12/981,978, 16 pages.
Office Action dated May 24, 2012 for U.S. Appl. No. 12/981,978, filed Dec. 30, 2010, 22 pages.
Response to Office Action dated May 24, 2012 filed Jul. 24, 2012 for U.S. Appl. No. 12/981,978, 13 pages.
Office Action dated Oct. 25, 2012 for U.S. Appl. No. 12/981,978, filed Dec. 30, 2010, 16 pages.

* cited by examiner

DYNAMIC COMPRESSION OF AN I/O DATA BLOCK

RELATED PATENT APPLICATIONS

This patent application is a continuation-in-part to application Ser. No. 12/981,978, filed Dec. 30, 2010 and entitled "DYNAMIC COMPRESSION OF AN I/O DATA BLOCK," which claims priority to PCT Patent Application Serial Number PCT/RU2010/000815, filed Dec. 30, 2010 and entitled "DYNAMIC COMPRESSION OF AN I/O DATA BLOCK," and both applications are incorporated herein by reference in their entirety.

BACKGROUND

Data compression is the process of reducing a file to a smaller size while still maintaining the data integrity. For example, redundancies are removed. Data compression can save storage space. Data compression can also save on bandwidth. Furthermore, data compression can save the amount of time it takes to transfer a file.

SUMMARY

In one aspect, a method of compressing data includes splitting an I/O into smaller I/Os based on an I/O throughput. The size of the smaller I/Os are equal or less than a set block size. The method also includes asynchronously compressing the smaller I/Os.

In another aspect, an article includes a non-transitory machine-readable medium that stores executable instructions. The instructions cause a machine to split an I/O into smaller I/Os based on an I/O throughput and asynchronously compress the smaller I/Os. The size of the smaller I/Os being equal or less than a set block size.

In a further aspect, a system includes circuitry configured to split an I/O into smaller I/Os based on an I/O throughput and asynchronously compress the smaller I/Os. The size of the smaller I/Os being equal or less than a set block size.

DETAILED DESCRIPTION

Compression algorithms on transport-level protocols do not reduce bandwidth usage if the data has been previously encrypted for security purposes; because, there is almost no redundancy in the encrypted data; compression algorithms need redundancy to effectively compress data.

DEFINITIONS

The following definitions are used herein:
I/O—input/output request which may be a read I/O request (read request) or a write request (write request).
SECTOR—Smallest readable chunk of bytes (e.g., 512 bytes)
C-BLOCK—Chunk of data that compression operates on. It is a multiple of sectors and must be aligned to the sector size.
C-BLOCK SIZE—Size that larger I/Os are broken up into. Break up of I/Os are done in such a way that all but the first and last of these "smaller" I/Os are aligned to the C-block size (e.g., 2048 bytes). Size of block that compression operates on.
C-METADATA—Metadata associated with compression of a block.
DATA BUFFER—Data associated with an I/O request.
THROUGHPUT—Number of bytes of I/O processed per second.

The following property of the read and write I/O request is of a particular interest. Most of the I/O requests (write and read I/O requests) coming from a file system, database management system (DBMS) or other upper layers have a size much larger than a single sector (>>512 bytes to 520 bytes). Usually the size is at least 4 KB and often the size is equal to 256 KB, 512 KB or more.

For this invention, when a logical unit (LUN) is used it is divided into C-blocks. Each of these C-blocks has a size of C-block size bytes which is a multiple of the sector size of disk. For example, it might have a C-block size of 8 KB, 16 KB and so forth.

Each C-block's data can be compressed or not compressed. In some examples, a C-block's data may require encryption and encryption is always performed after compression. There are four possible states of each block on the LUN: 1) its data is compressed and then encrypted, 2) its data is encrypted, 3) its data is compressed but not encrypted and 4) its data is neither compressed nor encrypted.

Figure 1A:
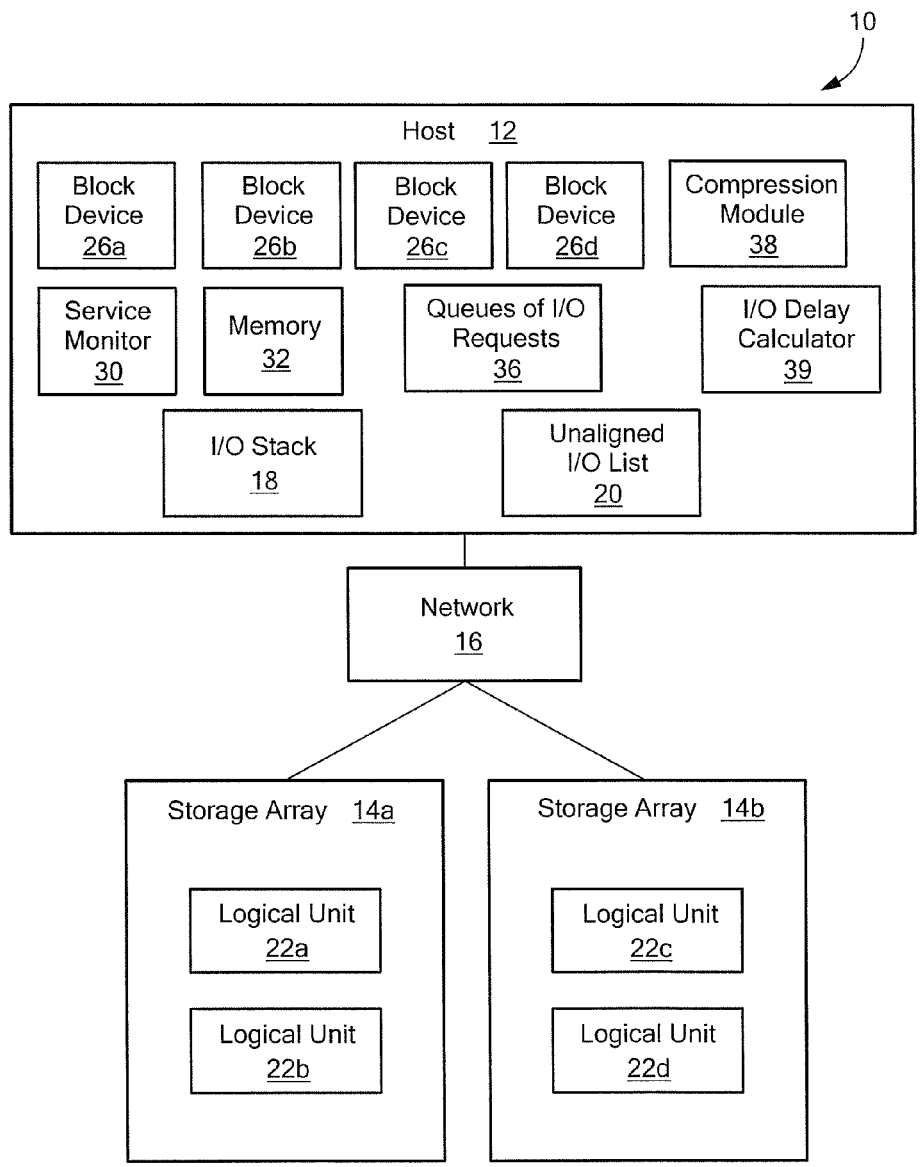
FIG. 1A is a block diagram of a computer system.
Figure 1B:
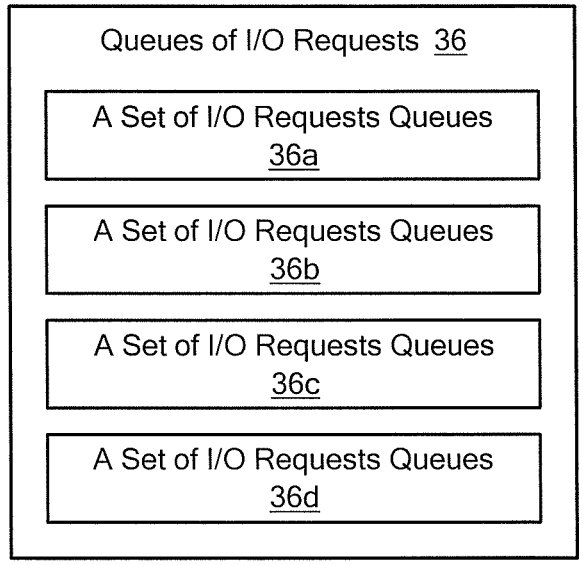
FIG. 1B is a block diagram of queues of I/O requests.

Referring to FIGS. 1A and 1B, a computing system 10 includes a host 12, storage arrays 14a-14b, each connected to a network 16 (e.g., a local area network (LAN), a wide area network (WAN), storage area network (SAN) and so forth). Each storage array 14a-14b includes logical units (sometimes abbreviated herein as "LUN"). For example, storage array 14a includes LUN 22a and LUN 22b and storage array 14b includes LUN 22c and LUN 22d.

The host 12 includes block devices 26a-26d, a service monitor 30, a memory 32, queues of I/O requests 36 including read and write I/O requests, a compression module 38 and an I/O delay calculator 39. In one example, each block device represents one LUN 22a-22d. For example, block device 26a corresponds to LUN 22a, block device 26b corresponds to LUN 22b, block device 26c corresponds to LUN 22c and block device 26d corresponds to LUN 22d. In other examples, more than one block device represents a LUN or one block device could represent multiple LUNs. As used herein, a block device is a device that accepts and processes data using blocks of data where a block can be as small as a sector and must be a multiple of a sector. The host also includes an I/O stack 18 (further described in FIG. 1D) and an unaligned I/O list 20 (see, for example, box 308 in FIG. 3).

The service monitor 30 measures the throughput (e.g., I/O throughput) and other performance and system characteristics of the block devices 26a-26d. The queues of I/O requests 36 store the I/O requests waiting to be implemented on the block devices 26a-26d. There may be a set of separate queues of I/Os for each LUN. For example, a set of queues of I/O requests 36a is associated with logical unit 22a, a set of queues of I/O requests 36b is associated with logical unit 22b, a set of queues of I/O requests 36c is associated with logical unit 22c and a set of queues of I/O requests 36d is associated with logical unit 22d. In an example where a LUN 22 is represented by a single block device 26, there is a separate queue (or set of queues) of I/Os for this block device. In an example when a LUN 22 is represented by several block devices, there is a single queue of I/Os for all these block devices representing the LUN. In other examples, there may be a single queue for all block devices in a different operating system design.

As used herein, each I/O request waiting in the queues 36 has not been sent to a corresponding logical unit 22a-22d. Each I/O request is eventually sent to a corresponding logical unit 22a-22d after a delay (which may, in some examples, be equal to zero). In one example, the delay is determined dynamically and may be changed quite often. The algorithm of calculating the delay may be implemented differently for different environments where this invention may be deployed. For instance, the algorithm could make use of performance information from the transport mechanism that carries I/O requests to the storage, A current delay value will usually depend on: current performance characteristics, several previous I/Os servicing characteristics (which are obtained from the service monitor 30), and previous I/O requests data size. With the delay at least two goals may be reached: 1. a load (e.g., on the lower devices and hence on the transport layer bandwidth) is smoother over time and 2. it can be determined to what degree the delay may be increased so that the performance characteristics like throughput remain the same. It is known that I/Os are always waiting for some period of time before they are sent over transport channel; however, the place, where I/Os are waiting is unknown. For example, the I/Os may be in a transport layer or in some of the block devices. The compression module 38 performs compression. The I/O delay calculator 39 can delay I/Os in order for compression to be performed. By introducing a delay with a non-zero value, more time is allowed for the asynchronous compression process to operate on the lower layer I/O queue 46b. The data of each I/O request may have encryption operations performed upon it.

Figure 1C:
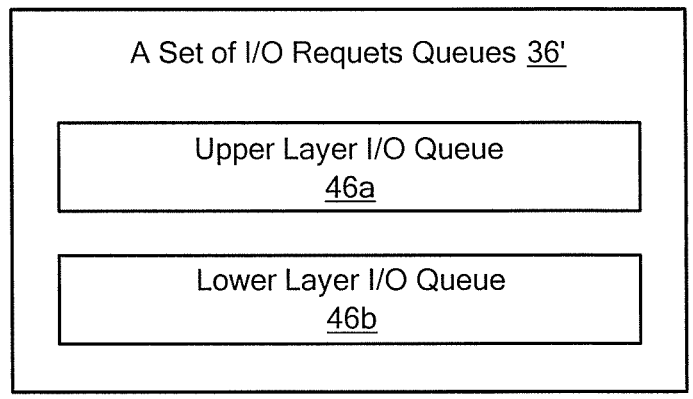
FIG. 1C is a block diagram of the types of I/O queues.

Referring to FIG. 1C, a set of I/O requests 36' (e.g., any one of the set of I/O queues 36a-36d) may include an upper layer I/O queue 46a and a lower layer I/O queue 46b. As will be described further, the upper layer I/O queue 46a and the lower layer I/O queue 46b are used in efficient handling of the I/Os.

Figure 1D:
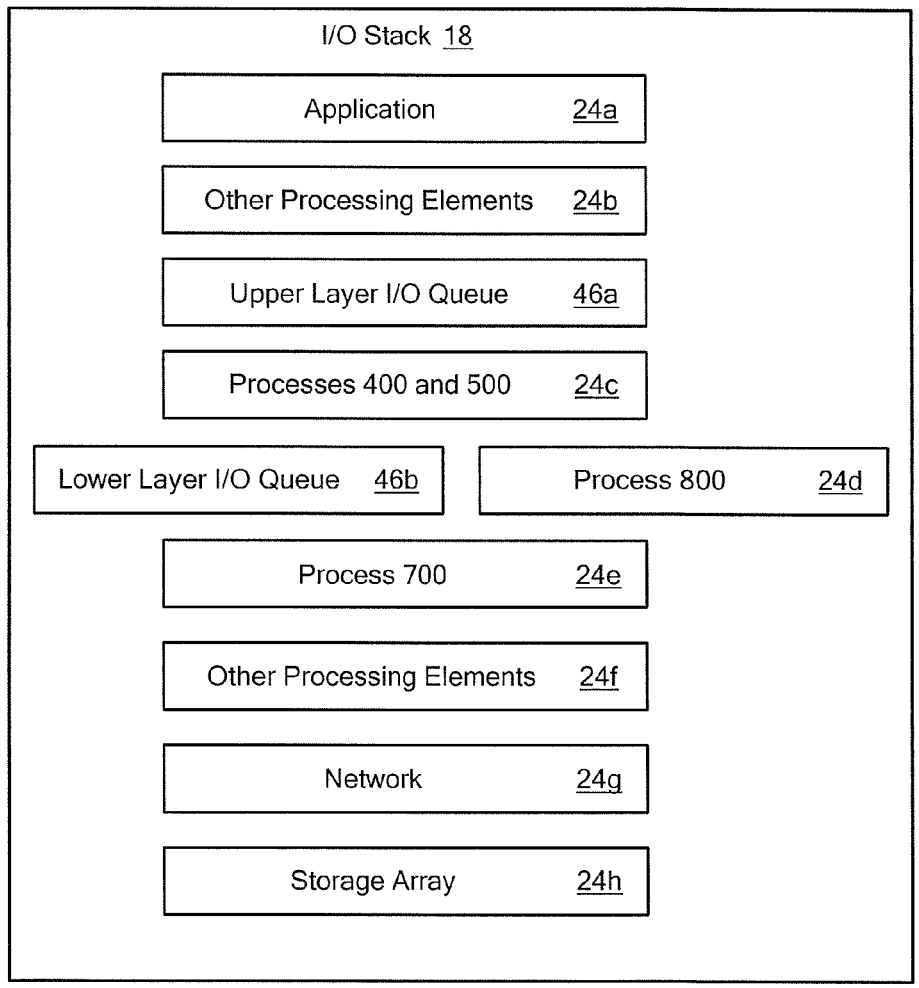
FIG. 1D is a block diagram of an I/O stack.

Referring to FIGS. 1A and 1D, as used herein reference will be made to an I/O stack 18 (see, for example, reference block 780 of process 700 in FIG. 7). The I/O stack 18 includes various layers of potential processing for an I/O. For example, the I/O stack may include an application layer 24a, other processing elements layer 24b, the upper layer I/O queue 46a, a layer 24c for processes 400 and 500 (see FIGS. 5 and 6), the lower layer I/O queue 46b, a layer 24d for process 800 (See FIG. 8A) at the same level as the lower layer I/O queue 46b, a layer 24e for process 700 (See FIG. 7), another layer for other processing elements 24f, a network layer 24g and a storage array layer 24h. Note that process 800' (FIG. 8B) may also exist at the same layer as process 800, but isn't shown in FIG. 1D. Since the I/O stack 18 has directionality, I/O requests move down the I/O stack 18 to be sent to the storage array and when completed, the completed I/O request moves back up the I/O stack 18 so that processing may occur in each layer on the completed I/O. FIG. 1D only shows the downward side of the I/O stack. Process 900 (FIGS. 9A and 9B but not shown in FIG. 1D) is executed on the completed I/O requests on the way back up the stack at the same layer as processes 400 and 500 are on the way down the stack. Layers denoted by box 24b and 24f are shown to indicate many other possible layers of I/O request processing that could exist in the I/O stack.

Figure 2A:
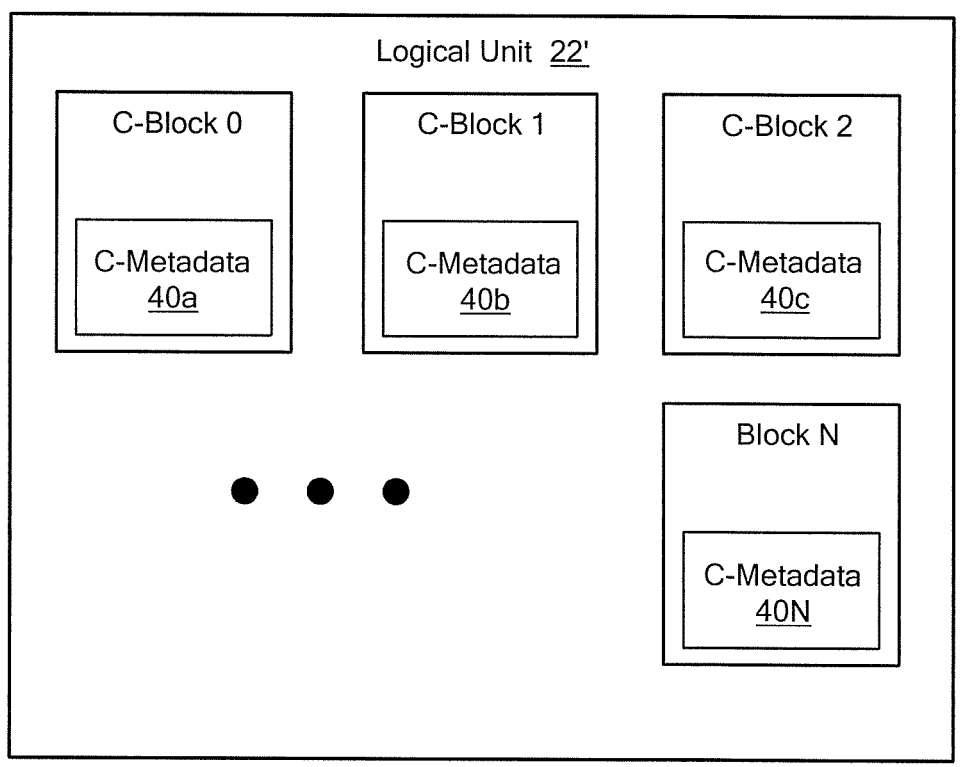
FIG. 2A is a block diagram of a logical unit.
Figure 2B:
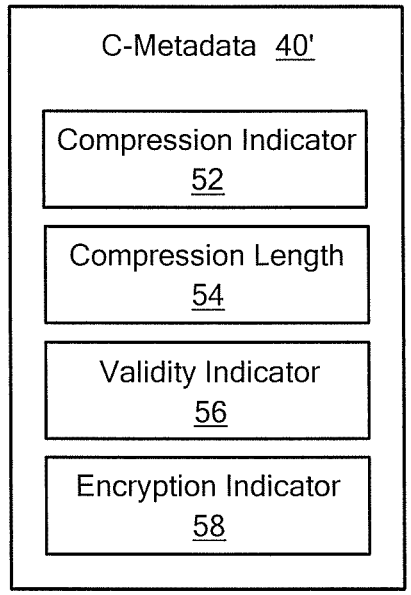
FIG. 2B is a block diagram of data structures in C-metadata.

Referring to FIGS. 2A and 2B, a logical unit, for example, a logical unit 22' includes data blocks (e.g., C-Block 0 to C-Block N) where data is stored. Each block (e.g., C-Block 0 to C-Block N) includes corresponding C-metadata 40a-40N. The C-metadata 40a-40N, for example, represented as C-metadata 40' includes a compression indicator 52, a compression length 54, a validity indicator 56 and an encryption indicator 58. The compression indicator 52 indicates whether the data in the C-block is compressed. In one example, a flag is set to True to indicate the data is compressed. In another example, the compression indicator is set to 0 when the data in the C-block is not compressed and to an integer indicating the algorithm used to compress the data when the data in the C-block is compressed. The compression length 54 indicates how many bytes the compressed data occupies if it is compressed. In other examples, metadata may also include a version of the compression algorithm used.

The validity indicator 56 indicates whether the data is valuable or being used and should not be erased. In one example, a flag set to True indicates that the data is needed. In other examples, if the block will be a target for a data migration or is otherwise being discarded, a flag will be reset to False before the migration is started or when the data is discarded for any other reason. The validity indicator 56 when it is set to False denotes that any data previously stored to the block data during the next Write operation need not be preserved (which avoids excessive prefetch read operation when they are unnecessary). Once new valid data is written to the block, the validity indicator is set to TRUE. The encryption indicator 58 indicates whether the data in the C-block is encrypted. In one example, a flag is set to True to indicate the data is encrypted. In another example, this field is not used, because the entire LUN is encrypted and that is handled by a different mechanism.

Figure 2C:
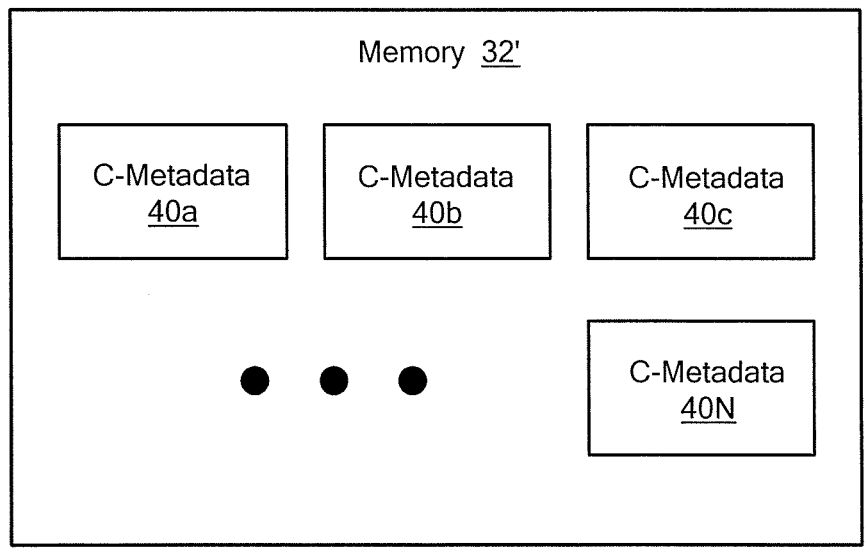
FIG. 2C is a block diagram of a memory of a host.

Referring to FIG. 2C, in other examples, the C-metadata 40' is stored at the memory 32 of the host 12. If the host is rebooted, C-metadata can be restored from the storage array. In further examples, the C-metadata 40' is stored at other locations within the LUN than at the corresponding data block.

Figure 3:
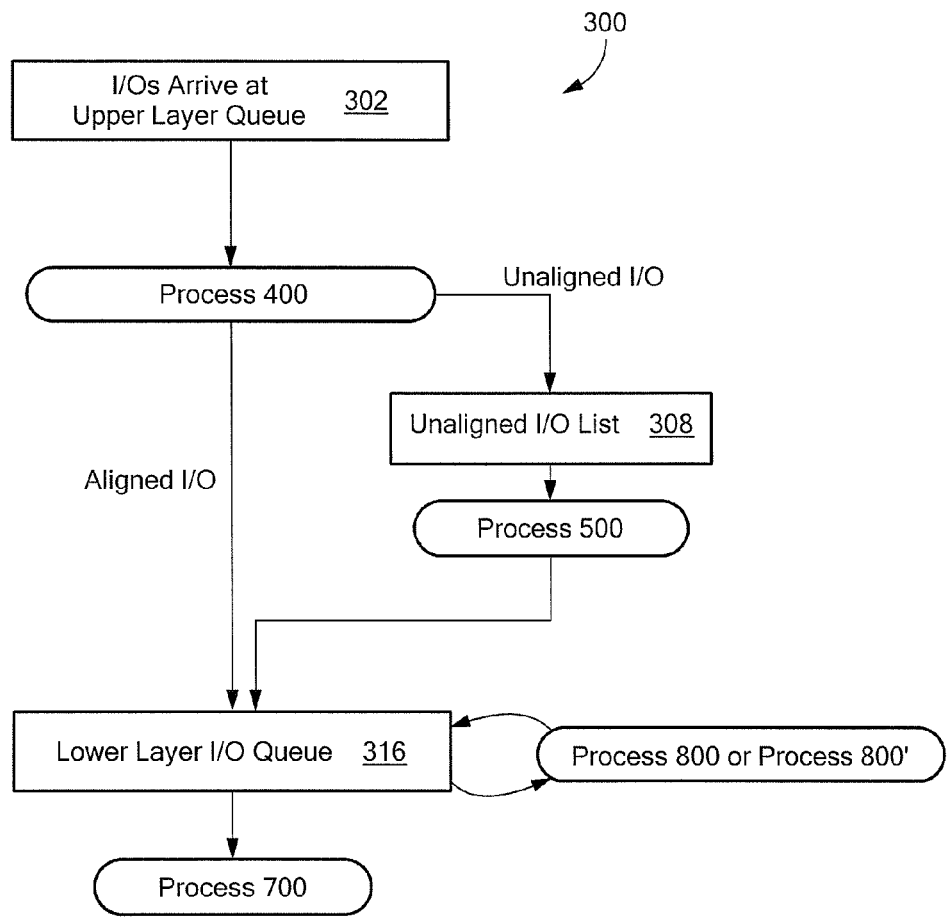
FIG. 3 is a flowchart of a process to handle I/O requests.

Referring to FIG. 3, an example of an overall process of how I/Os are handled is a process 300. I/O requests arrive at the upper layer I/O queue 46a (302), for example, from applications and are then handled by a process 400 (FIG. 5) which splits the I/O requests into smaller I/O requests (also referred herein as smaller I/Os) if compression is enabled in such a way that all but the first and last of these smaller I/Os are of a C-block size and aligned to the C-block size. The first and the last of these smaller I/Os might be aligned to C-block size (and if so are of C-block size) or not aligned to C-block size and if so not a C-block size. Process 400 places the unaligned I/Os into the unaligned I/O list 20 (308) and sends those I/Os to process 500 (FIG. 6) to be aligned. The aligned I/Os created by process 400 and I/Os processed by process 500 are sent to the lower layer I/O queue 46b (316). The aligned I/Os go directly to the lower layer I/O queue 46b (316). From the lower layer I/O queue 46b, a process 800 (FIG. 8A) or process 800' (FIG. 8B) compresses the data of the I/O requests. A process 700 (FIG. 7) handles I/O requests on the lower layer I/O queue sending them down the I/O stack, performing encryption if needed.

Figure 4:
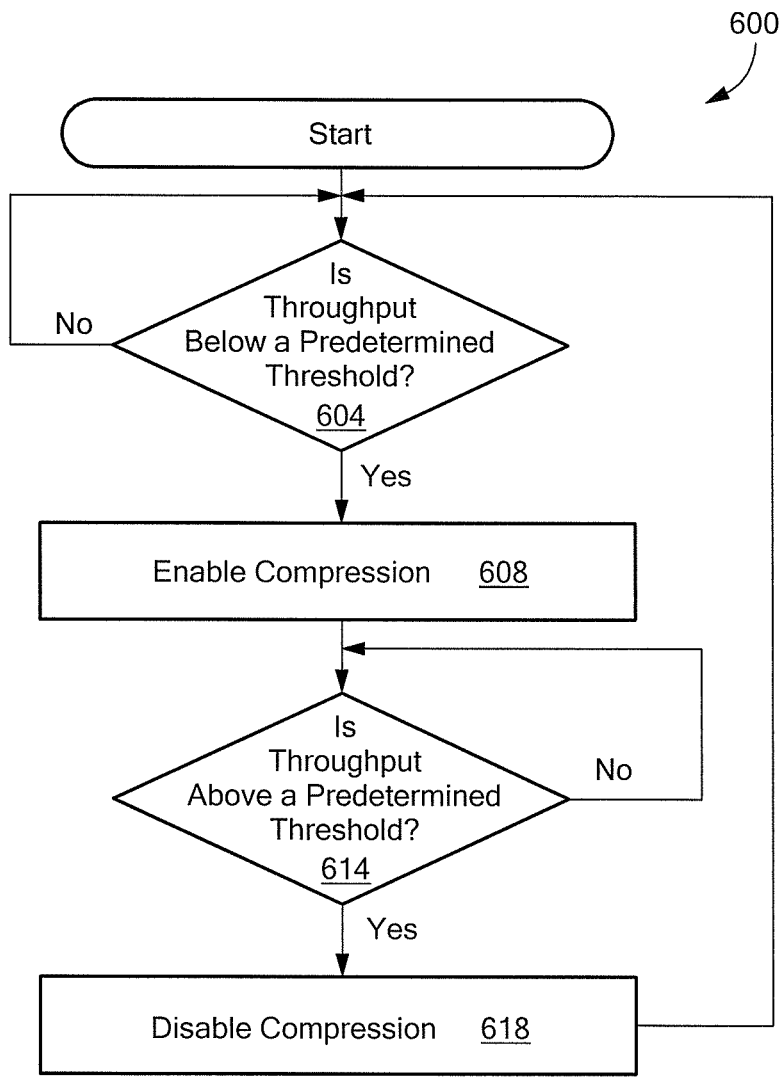
FIG. 4 is a flowchart of an example of a process to enable compression based on system performance.

Referring to FIG. 4 one example of a process to enable compression based on performance is a process 600. Process 600 determines if the throughput is below a predetermined threshold (604). For example, the service monitor 30 monitors I/O throughput. If the amount of bytes-per-second being processed falls below a predetermined threshold, process 600 will enable compression (608). For example, compression is performed asynchronously using threads executing process 800 or 800'. Process 600 determines if the throughput is above a predetermined threshold (614). If the throughput is above a predetermined threshold, process 600 disables compression (618).

Figure 5:
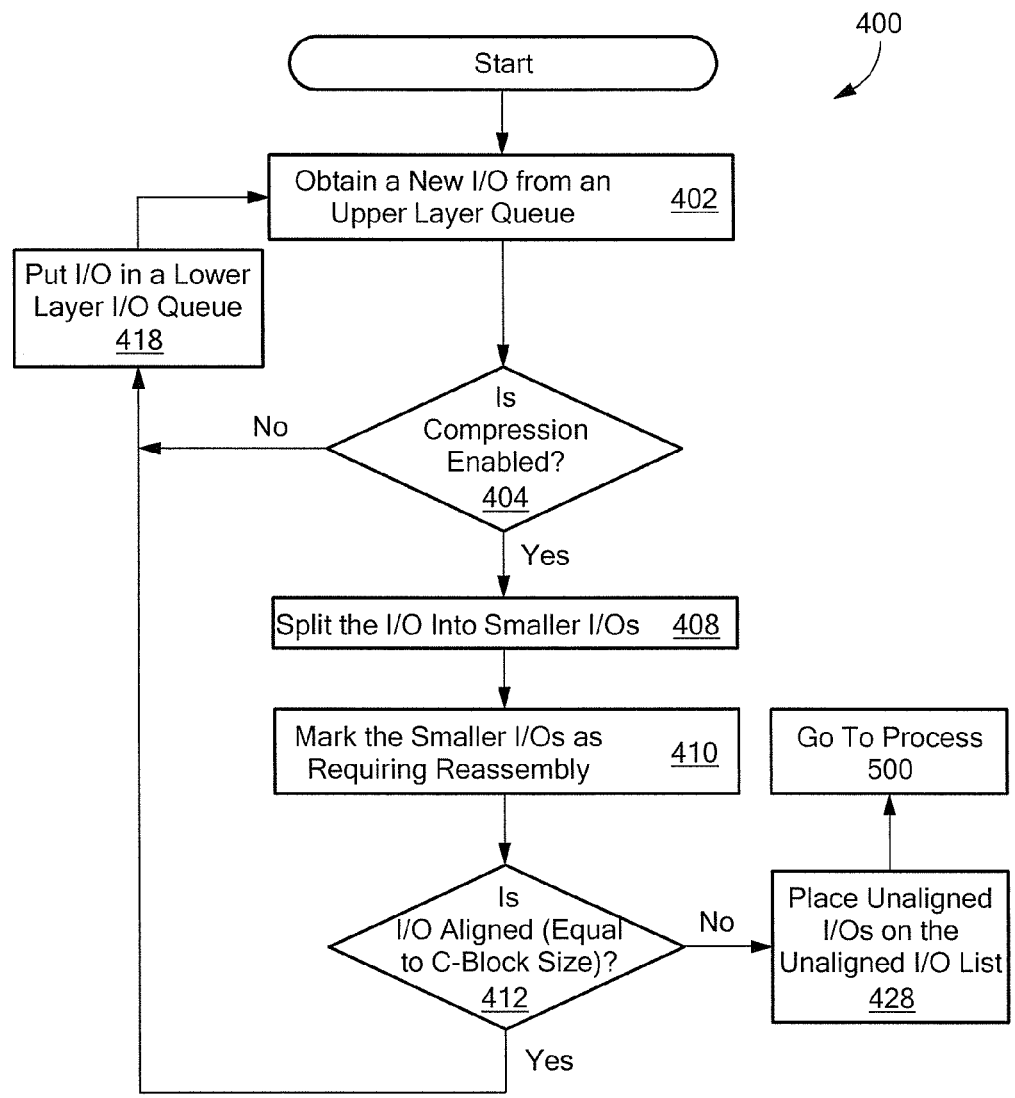
FIG. 5 is a flowchart of an example of a process to split I/O requests.

Referring to FIG. 5, an example of a process for splitting I/O requests is a process 400. For example, splitting I/Os if the original I/O is larger than a C-block size. Process 400 obtains a new I/O from an upper layer I/O queue 46a (402). Process 400 determines if compression is enabled (404). In one example, when determining if compression is enabled, process 400 may also check the C-metadata 40' for the C-block(s) of the I/O because even if compression is not enabled now, compression might have been used the last time the data was written, and, in that case, compression still needs to be handled when reading (after read in process 900) or writing (if the data block is unaligned). In particular, with respect to writes, process 400 reads the compression indicator 52 to determine whether the data at the C-block is compressed or not. If it is compressed, even if compression is currently not enabled, and if the beginning or end of the data block of the I/O request is not aligned, then the steps in process 400 proceed as if compression is enabled.

If compression is not enabled, process 400 puts the I/O in a lower layer I/O queue 46b (418) and proceeds to processing block 402. If compression is enabled, process 400 splits the I/O into smaller I/Os (408) and marks the smaller I/Os as requiring reassembly (410).

Process 400 determines if an I/O is aligned (i.e., equal to C-block size) (412). If the I/O is aligned, process 400 puts the I/O in a lower layer I/O queue 46b (418) and proceeds to processing block 402. If the I/O is not aligned, process 400 places the unaligned I/O on the unaligned I/O list 20 (428) and goes to process 500 for further processing (as shown in FIG. 3). Note that when a larger I/O is split into smaller I/Os only the first or last (or possibly both) I/O in the new sequence might be unaligned. Also note that I/Os smaller than C-block size may also be placed on the unaligned I/O list 20.

Figure 6:
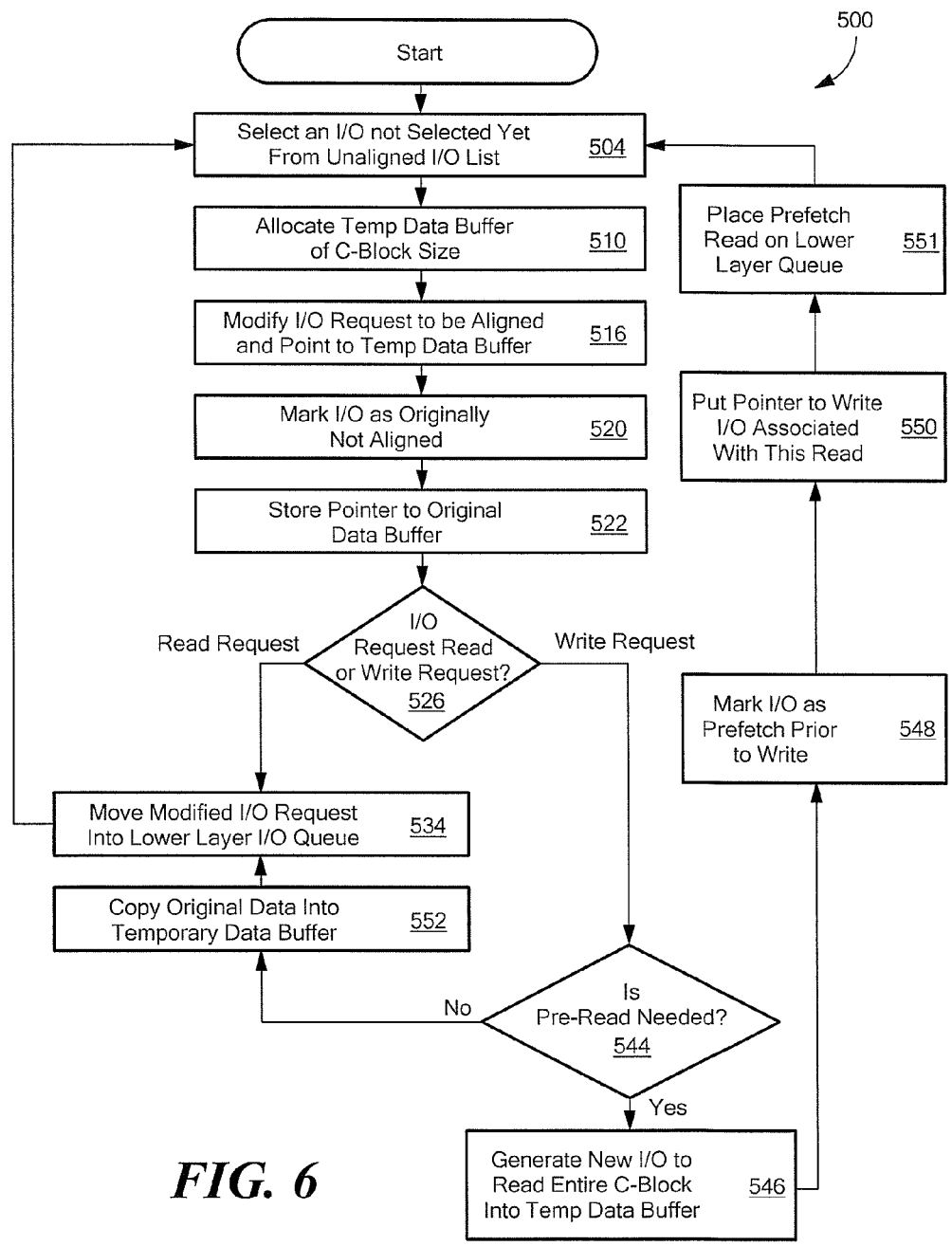
FIG. 6 is a flowchart of an example of process to handle I/O requests from an unaligned I/O list.

Referring to FIG. 6, a process 500 is an example of a process to handle I/Os from the unaligned I/O list 20. Process 500 selects an I/O not previously selected by the process 500 from the unaligned I/O list 20 (504). Process 500 allocates a temporary data buffer of C-block size (510) and modifies the I/O request to be aligned and points to the temporary data buffer (516).

Process 500 marks the I/O request as originally not aligned (520) and stores a pointer to the original data buffer (522) for use in I/O completion processing. Process 500 determines if the I/O is a read or write request (526). If the I/O is a read request, process 500 moves the modified I/O request into the lower layer I/O queue 46b (534) and proceeds back to processing block 504.

If the I/O is a write request, process 500 determines if a prefetch read is needed (544). If a prefetch read is not needed (i.e., the validity indicator 56 of the C-metadata 40' for this C-block is marked FALSE.) process 500 copies the original data into the appropriate portion of the temporary data buffer (552), moves the modified I/O request into the lower layer I/O queue 46b (534) and proceeds back to processing block 504.

If a prefetch read is needed, process 500 generates a new I/O request to read the entire C-block into the temporary data buffer (546), marks the I/O as prefetch prior to write (548) and puts a pointer to the write I/O request associated with this read (550) into the read request. Process 500 places the prefetch read on a lower layer I/O queue 46b (551) and proceeds back to processing block 504.

Figure 7:
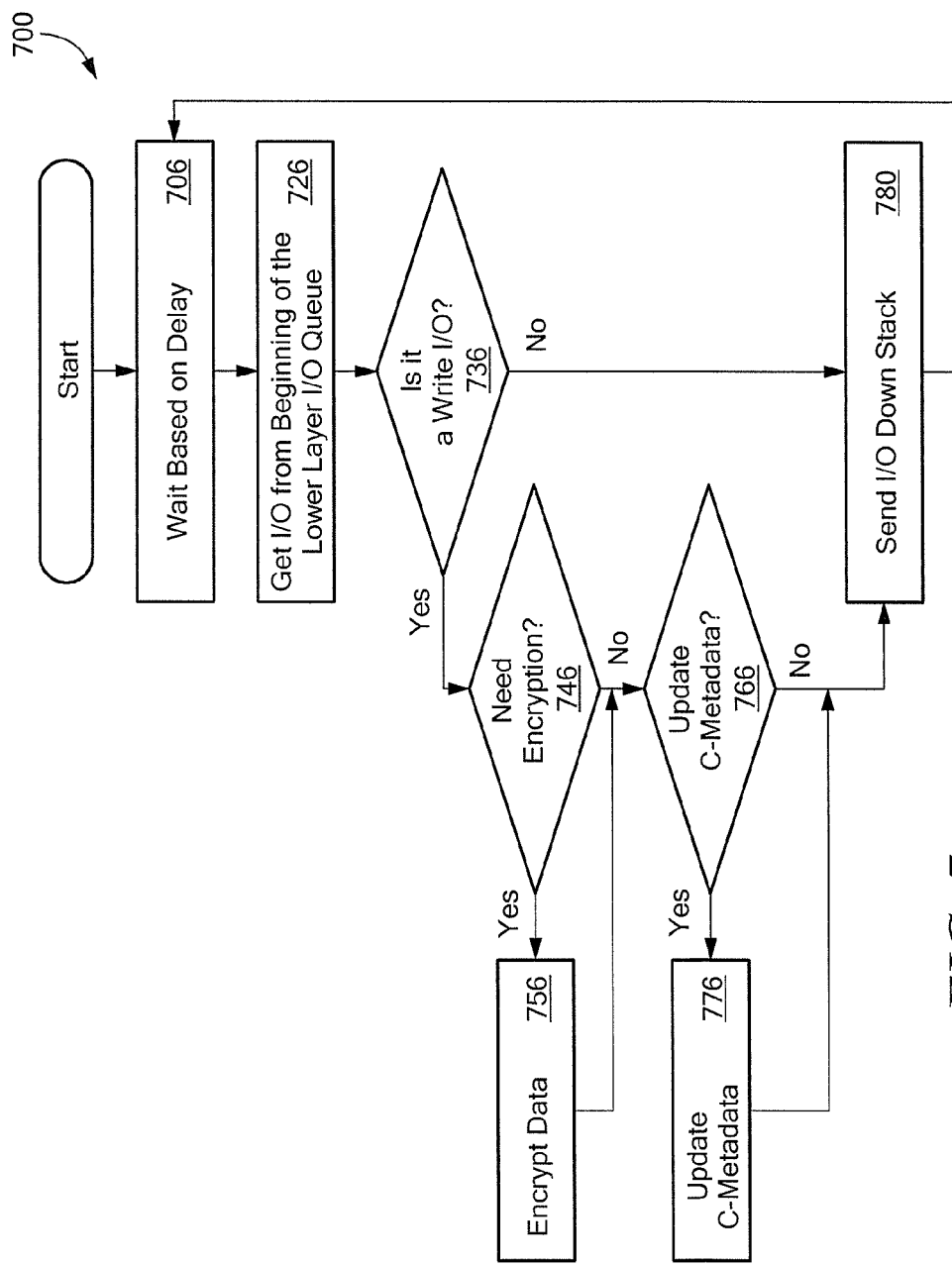
FIG. 7 is a flowchart of an example of a process to handle I/O requests.

Referring to FIG. 7, an example of how I/Os are processed from the lower layer queue 46b is a process 700. Process 700 waits based on a delay (706). The delay, for example, is provided by the I/O delay calculator 39. In one example, the delay is zero. In some examples, there are several block devices at the lower layer which can accept I/Os (also called multipathing). In this example, each single lower layer device (so-called "path") has its own delay value so that each path has a delay value which is calculated independently of all other paths. In one particular example, when performing processing block 706, if the path is known then the corresponding delay for that path will be used.

Once the delay time has expired, process 700 gets an I/O request from the beginning of the lower layer I/O queue 46b (726). Process 700 determines if the I/O request is a write I/O (736). If it is not a write I/O, process 700 sends the I/O down the I/O stack 18 (780). If it is a write I/O process 700 determines if the I/O needs to be encrypted (746), for example, if encryption has been enabled for this LUN or block device. If encryption is needed, the I/O data is encrypted (756). In some examples, encryption (if encryption is enabled) takes some time to process and adds some additional delay so that the I/O delay (706) may be reduced by a value which corresponds to the time in which the I/O has spent at the encryption stage (in processing block 756).

Figure 8A:
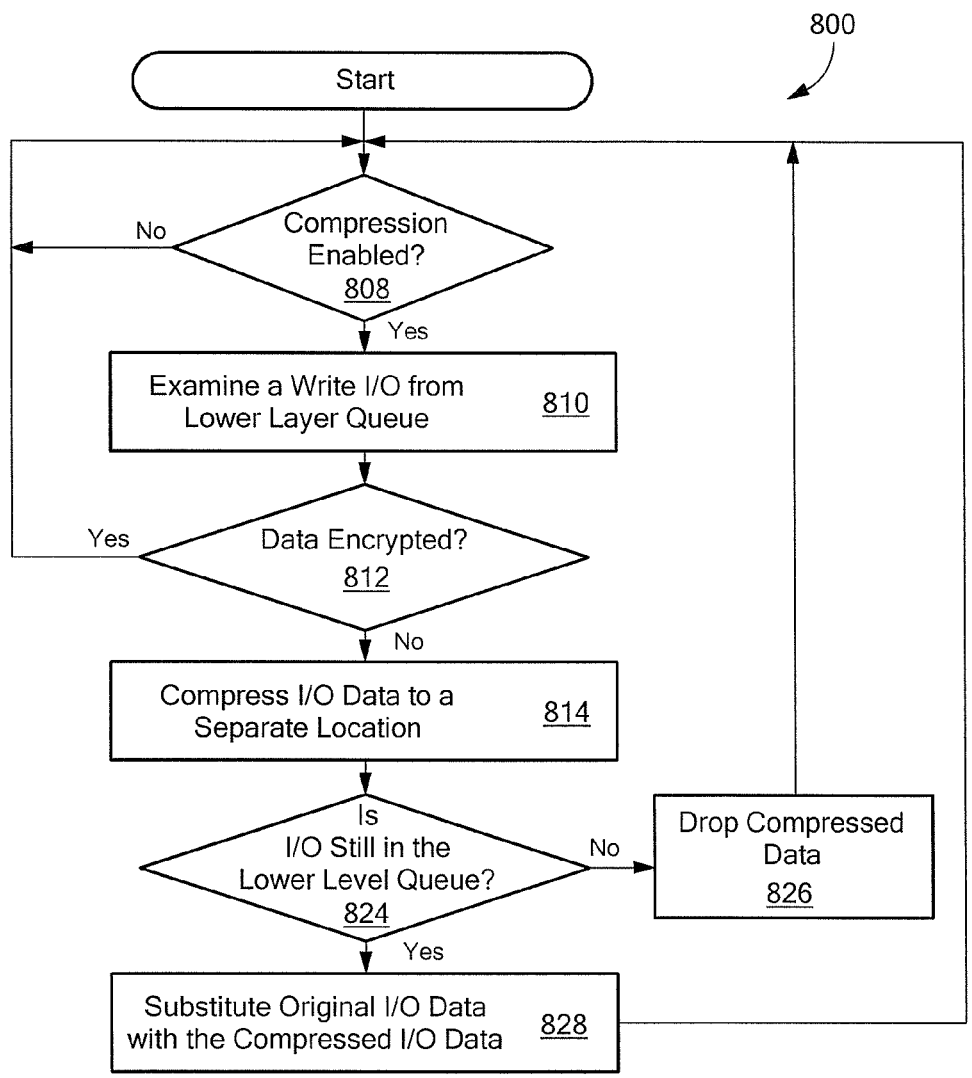
FIG. 8A is a flowchart of an example of a process to compress I/O data.

Process 700 determines if the C-metadata needs updating (766) and if the C-metadata 40' needs updating process 700 updates the C-metadata 40' (776) and sends the I/O down the I/O stack 18 (780). For example, the compression indicator 52, the compression length 54 and potentially the validity indicator 56 may all need to be updated when a C-block is written. In particular, the validity indicator 56 is set to TRUE if it is not already set to True. The compression indicator 52 is set to TRUE and the compression length 54 is updated if the data is compressed (or if it was previously compressed and isn't any longer, then the compression indicator 52 is set to FALSE). In another example, the compression indicator 52 is set to the version of compression algorithm used if the data is currently compressed. The version of compression algorithm might also incorporate information about multiple-stage compression if it is being used. Referring to FIG. 8A, an example of process to compress I/O data is a process 800. In particular, process 800 operates on I/Os from the lower layer queue 46b. Process 800 determines if compression has been enabled (808) and if compression is enabled process 800 examines a write I/O from the lower level I/O queue 46b (810).

Process 800 determines if the write I/O is encrypted (812) and if the write I/O is not encrypted, process 800 compresses the I/O data to a separate location (814).

Process 800 determines if the I/O is still in the lower layer I/O queue 46b (824). If the I/O is not in the lower layer I/O queue 46b, process 800 drops the compressed I/O data (826) and proceeds back to processing block 808. If the I/O is still in the lower layer I/O queue 46b, process 800 substitutes the original I/O data buffer with the data buffer into which the compressed I/O was written (828) and proceeds back to processing block 808.

In processing block 828, the original location of the data is tracked. If the location before substitution is a temporary data buffer, the location has already been recorded; but, the temporary data buffer is deallocated since it is basically being discarded in favor of the buffer with the compressed data.

The techniques herein may be applied to multi-stage compression techniques. For example, at first compression stage a data block is compressed into a temporary buffer by a first compression algorithm in an asynchronous manner. After the completion of the first compression stage, the I/O request is changed to point to the buffer with the compressed data from the first stage (if the I/O request is still on the queue). Compressed data from the first stage is then compressed by a second compression algorithm in an asynchronous manner into a different temporary buffer and the I/O request is changed again to point to the buffer bugger with the compressed data from the second stage and so forth.

Figure 8B:
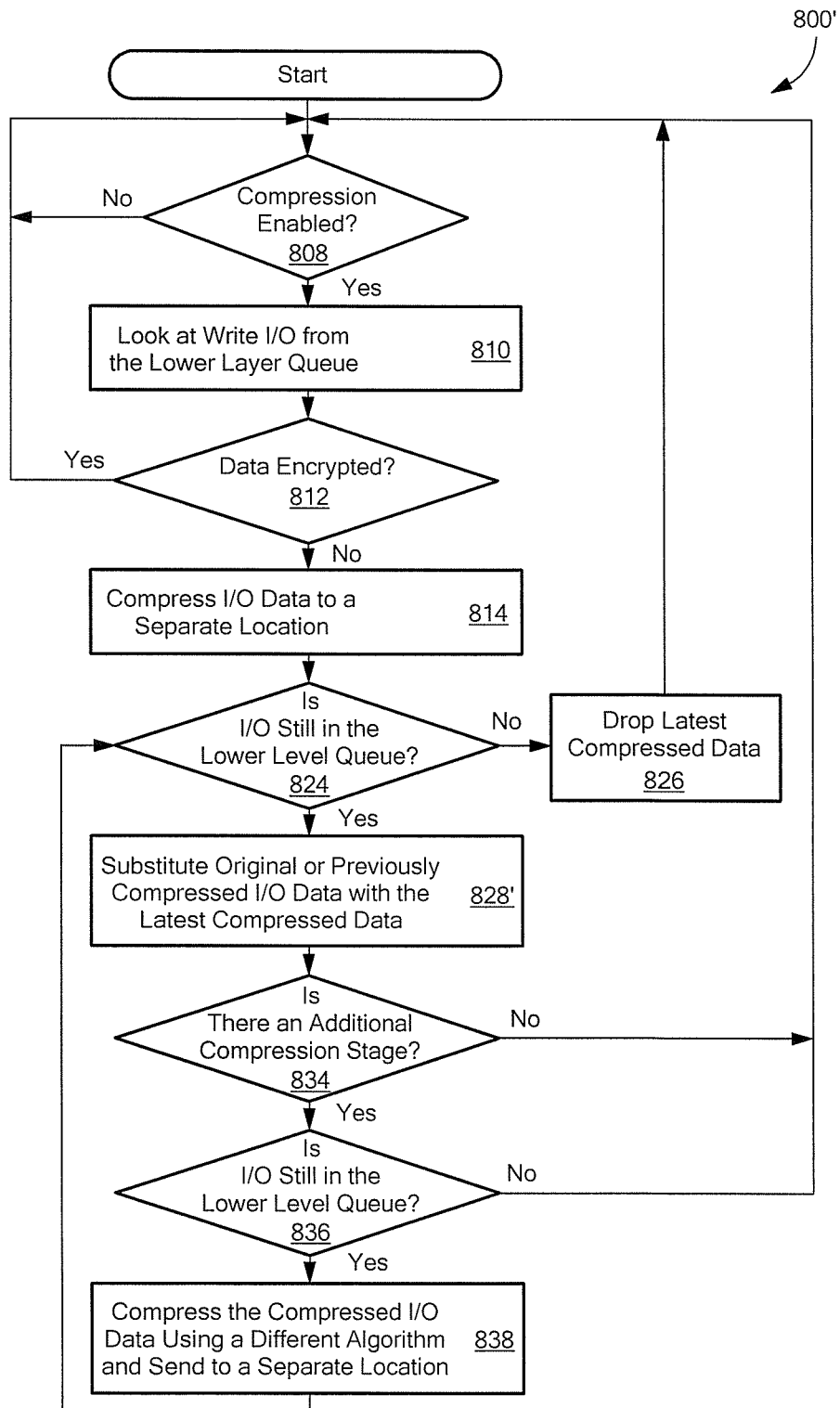
FIG. 8B is a flowchart of an example of a process to compress I/O data using multi-stage compression.

Referring to FIG. 8B, a process 800' is an example of multi-stage compression. For example, process 800' is the same as process 800 but includes processing blocks 834-838 and processing block 828 is replaced with processing block 828'. In particular, after processing block 824, process 800' substitutes original or previously compresses I/O data with the latest compressed data (828') and determines if there is an additional compression stage (834) and whether the I/O is still in the queue (836). If there is an additional compression stage and the I/O is still in the queue, the compressed data is compressed using a different algorithm and sent to a separate location (838). Otherwise, process 800' proceeds back to processing block 808.

Block cipher algorithms may make encryption on a per-block basis with its own block size (i.e., every block is encrypted and can be decrypted independently of the others). In other examples of techniques of compression, a C-block size which is used for a compression algorithm described herein may be a multiple of a block size used with an encryption algorithm. In other examples, encryption is performed based on sector size because that is the smallest unit that can be read/written for a block device.

Figure 9A:
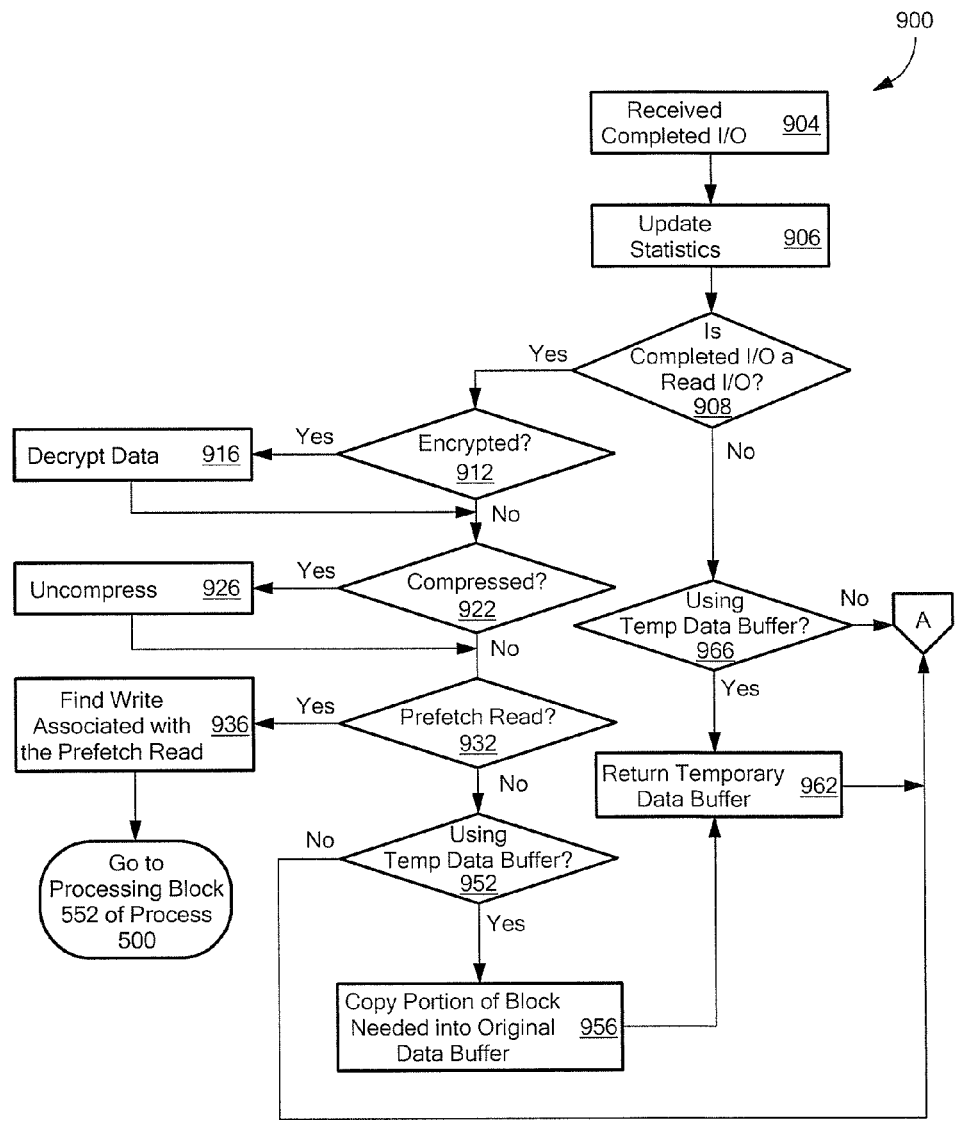
FIGS. 9A and 9B are a flowchart of a process to further handle I/O requests after I/O completion.
Figure 9B:
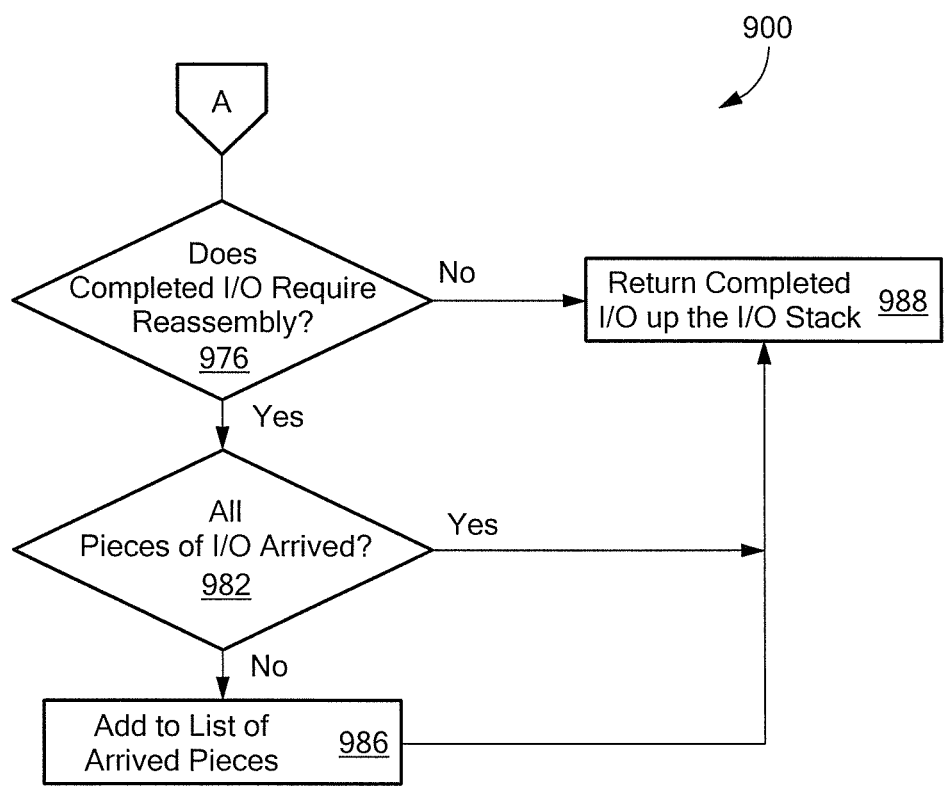

Referring to FIGS. 9A and 9B, a process 900 is an example of a process used to further handle I/Os. Process 900 receives a completed I/O moving up the I/O stack 18 (904) and updates the statistics (906). For example, process 900 updates statistics at the service monitor 30 which are used by the I/O delay calculator 39 and, in particular, calculation of throughput used for compression determination in Process 600 as well as other statistics used for I/O delay calculation.

Process 900 determines if the completed I/O is a read I/O request (908). If the completed I/O is a read I/O request, process 900 determines if the data is encrypted (912) and if the data is encrypted (e.g., the encryption indicator 58 is set to True), process 900 decrypts the data (916).

Process 900 determines if the I/O data is compressed (922). For example, process 900 reads the compression indicator 52 to determine whether the data at the block is compressed or not. If the I/O data is compressed, process 900 uncompresses the I/O data (926).

Process 900 determines if the completed I/O is a prefetch read (932). If the completed I/O is a prefetch read, process 900 finds the write associated with the prefetch read (936) and goes to processing block 552 of process 500 (FIG. 6) for further processing. For the original write, the original write data is copied into the appropriate part of the temporary data buffer (both write I/O and prefetch read I/O point to the same temporary data buffer). Then the original write is put on the lower layer queue 46b. Once the copy is done, the prefetch read can be discarded but ensuring that the buffer used by the write I/O is not returned at this point.

If the completed I/O is not a prefetch read, process 900 determines if the completed I/O is using a temporary data buffer (952). If the completed I/O is using a temporary data buffer, process 900 copies the portion of the temporary data buffer needed into the original data buffer (956) and returns (deallocates) the temporary data buffer (962).

Going back to processing block 908, if the completed I/O request is not a read I/O (i.e., a write I/O), process 900 determines if the write I/O is using a temporary data buffer (966). If the write I/O request is using a temporary data buffer, process 900 returns (deallocates) the temporary data buffer (962).

Process 900 determines if the completed I/O requires reassembly (976). If the completed I/O requires reassembly, process 900 determines if all the pieces of the I/O have arrived (982). If not all of the pieces of the I/O have arrived, process 900 adds the I/O to a list of arrived pieces (not shown) associated with original I/O request as it arrived at the upper layer I/O queue 46a (986). Otherwise, if the I/O does not require reassembly or all its pieces have arrived, process 900 returns the completed (possibly reassembled) I/O request up the I/O stack 18 (988). In one example, the list of arrived pieces may replaced by a bit map or any other mechanism that tracks arrived pieces.

Figure 10:
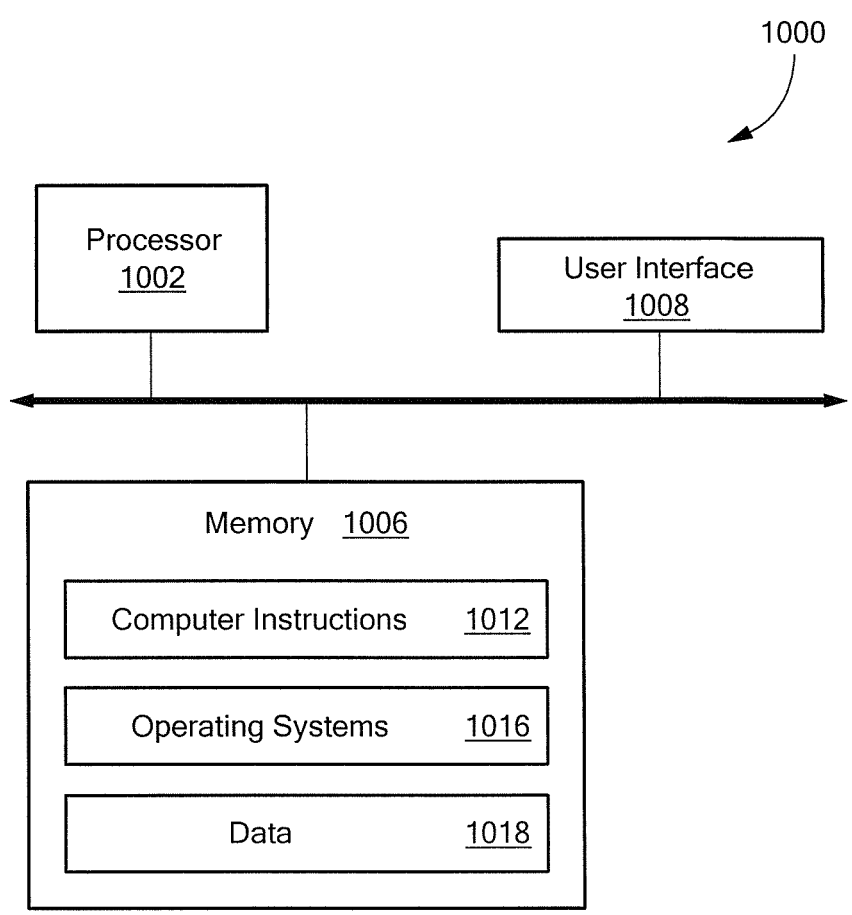
FIG. 10 is a computer on which any of the processes described herein may be implemented.

Referring to FIG. 10, a computer 1000 includes a processor 1002, a memory 1006 and a user interface (UI) 1008 (e.g., a mouse, a keyboard, a display, touch screen and so forth). The memory 1006 stores computer instructions 1012, an operating system 1016 and data 1018. In one example, the computer instructions 1012 are executed by the processor 1002 out of memory 1004 to perform all or part of the processes described herein (e.g., processes 400 to 900).

The processes described herein (e.g., processes 400 to 900) are not limited to use with the hardware and software of FIG. 10; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium includes but is not limited to a hard drive, compact disc, flash memory, non-volatile memory, volatile memory, magnetic diskette and so forth but does not include a transitory signal per se.

The processes described herein are not limited to the specific examples described. For example, the processes described herein (e.g., processes 400 to 900) are not limited to the specific processing order of FIGS. 4 to 9B. Rather, any of the processing blocks of FIGS. 4 to 9B may be re-ordered, combined or removed, performed in parallel or in serial, as necessary, to achieve the results set forth above.

The processing blocks in FIGS. 4 to 9B associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method of compressing data comprising:
   obtaining an input/output request (I/O) from an upper layer I/O queue;
   determine if compression is enabled;
   putting the I/O in a lower layer I/O queue if compression is not enabled;
   splitting the I/O into smaller I/Os if compression is enabled, the compression being enabled based on an I/O throughput, the size of the smaller I/Os being equal or less than a set block size;
   asynchronously compressing the smaller I/Os if compression is enabled;
   if compression is enabled:
      marking the smaller I/Os as requiring reassembly; and
      determining if the I/O is aligned;
   obtaining the I/O from the beginning of the lower layer I/O queue;
   determining if the I/O is a write I/O;
   encrypting the I/O data if the I/O is a write I/O;
   updating C-metadata if the I/O is a write I/O; and
   sending the I/O down an I/O stack.

2. The method of claim 1, further comprising storing the C-metadata comprising a compression indicator, a compression length and a validity indicator.

3. The method of claim 2 wherein storing the C-metadata comprises storing the metadata on a storage array associated with a block device.

4. The method of claim 2 wherein storing the C-metadata comprises storing the metadata on a memory of a host.

5. The method of claim 2, further comprising:
   determining if the I/O is a read request or a write request; and
   if the I/O is a write request, determining if the data in a block is needed based on the validity indicator associated with the block.

6. The method of claim 1 wherein asynchronously compressing the smaller I/Os comprises asynchronously compressing the smaller I/Os if the I/O throughput is below a predetermined threshold value.

7. The method of claim 1, further comprising placing unaligned I/Os on an unaligned I/O list.

8. The method of claim 1, further comprising:
   examining a write I/O from the lower layer I/O queue if compression is enabled; and
   compressing I/O data, using a first compression algorithm, to a separate location if the I/O data is not encrypted.

9. The method of claim 8, further comprising:
   determining if the write I/O is still in the lower layer I/O queue;
   substituting original I/O data with the compressed I/O data if the write I/O is still in the lower layer I/O queue; and
   dropping the compressed I/O data if the write I/O is not still in the lower layer I/O queue.

10. The method of claim 8, further comprising compressing the compressed I/O data using a second compression algorithm.

11. A method of compressing data comprising:
    obtaining an input/output request (I/O) from an upper layer I/O queue;
    determine if compression is enabled;
    putting the I/O in a lower layer I/O queue if compression is not enabled;
    splitting the I/O into smaller I/Os if compression is enabled, the compression being enabled based on an I/O throughput, the size of the smaller I/Os being equal or less than a set block size;
    asynchronously compressing the smaller I/Os if compression is enabled;
    if compression is enabled:
       marking the smaller I/Os as requiring reassembly; and
       determining if the I/O is aligned;
    receiving a completed I/O;
    if the completed I/O is a read I/O:
       decrypting data from the read I/O if the data from the read I/O is encrypted; and
       uncompressing the data from the read I/O if the data from the read I/O is compressed;
    finding a write associated with a prefetch read if the read I/O is a prefetch read.

12. The method of claim 11, further comprising storing the C-metadata comprising a compression indicator, a compression length and a validity indicator.

13. The method of claim 12 wherein storing the C-metadata comprises storing the metadata on a storage array associated with a block device.

14. The method of claim 12 wherein storing the C-metadata comprises storing the metadata on a memory of a host.

15. The method of claim 11 wherein asynchronously compressing the smaller I/Os comprises asynchronously compressing the smaller I/Os if the I/O throughput is below a predetermined threshold value.

16. An article comprising:
a non-transitory machine-readable medium that stores executable instructions, the instructions causing a machine to:
  obtain an input/output request (I/O) the I/O from an upper layer I/O queue;
  determine if compression is enabled;
  put the I/O in a lower layer I/O queue if compression is not enabled;
  split the I/O into smaller I/Os if compression is enabled, compression being enabled based on an I/O throughput;
  asynchronously compress the smaller I/Os if compression is enabled;
  if compression is enabled:
    mark the smaller I/Os as requiring reassembly; and
    determine if the I/O is aligned, wherein the size of the smaller I/Os being equal or less than a set block size;
  examine a write I/O from the lower layer I/O queue if compression is enabled;
  compress I/O data, using a first compression algorithm, to a separate location if the I/O data is not encrypted;
  determine if the write I/O is still in the lower layer I/O queue;
  substitute original I/O data with the compressed I/O data if the write I/O is still in the lower layer I/O queue; and
  drop the compressed I/O data if the write I/O is not still in the lower layer I/O queue.

17. The article of claim 16 wherein the instructions causing the machine to asynchronously compress the smaller I/Os comprises instructions causing a machine to asynchronously compress the smaller I/Os if the I/O throughput is below a predetermined threshold value.

18. The article of claim 16, further comprising instructions causing the machine to:
  obtain the I/O from the beginning of the lower layer I/O queue;
  determine if the I/O is a write I/O;
  encrypt the I/O data if the I/O is a write I/O;
  update C-metadata if the I/O is a write I/O; and
  send the I/O down an I/O stack.

19. A system, comprising:
circuitry configured to:
  obtain an input/output request (I/O) from an upper layer I/O queue;
  determine if compression is enabled;
  put the I/O in a lower layer I/O queue if compression is not enabled;
  split the I/O into smaller I/Os if compression is enabled, compression being enabled based on an I/O throughput;
  asynchronously compress the smaller I/Os;
  if compression is enabled:
    mark the smaller I/Os as requiring reassembly; and
    determine if the I/O is aligned, wherein the size of the smaller I/Os being equal or less than a set block size;
  obtain the I/O from the beginning of the lower layer I/O queue;
  determine if the I/O is a write I/O;
  encrypt the I/O data if the I/O is a write I/O;
  update C-metadata if the I/O is a write I/O; and
  send the I/O down an I/O stack.

20. The system of claim 19 wherein the circuitry to asynchronously compress the smaller I/Os comprises circuitry to asynchronously compress the smaller I/Os if the I/O throughput is below a predetermined threshold value.

* * * * *